(12) United States Patent
Kozin et al.

(10) Patent No.: US 9,990,231 B2
(45) Date of Patent: Jun. 5, 2018

(54) RESOURCE PRE-CONFIGURATION (71) Applicant: International Business Machines Corporation, Armonk, NY (US)

(72) Inventors: Daniel Kozin, Santa Clara, CA (US); Meichi M. Lin, San Jose, CA (US); Nigel G. Slinger, Los Gatos, CA (US); John B. Tobler, San Jose, CA (US); Wen Jie Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 14/730,258

(22) Filed: Jun. 4, 2015

(65) Prior Publication Data

US 2015/0378829 A1    Dec. 31, 2015

(30) Foreign Application Priority Data

Jun. 27, 2014  (CN) .......................... 2014 1 0301955

(51) Int. Cl.
*G06F 11/00* (2006.01)
*G06F 9/50* (2006.01)
*G06F 11/30* (2006.01)

(52) U.S. Cl.
CPC ............ *G06F 9/50* (2013.01); *G06F 11/3051* (2013.01)

(58) Field of Classification Search
CPC ..... G06F 11/1458; G06F 11/3051; G06F 9/50
See application file for complete search history.

(56) References Cited

U.S. PATENT DOCUMENTS

| | | | | |
|---|---|---|---|---|
| 7,640,353 B2* | 12/2009 | Shen | ...................... | H04L 12/00 709/230 |
| 8,010,337 B2* | 8/2011 | Narayanan | .......... | G06F 11/3419 703/22 |
| 8,112,587 B2* | 2/2012 | Cantin | ................ | G06F 12/0813 711/132 |
| 8,224,845 B2* | 7/2012 | Broll | ................. | G06F 17/30306 707/718 |
| 8,458,517 B1* | 6/2013 | Vermeulen | .......... | G06F 11/1458 709/201 |
| 8,631,094 B1 | 1/2014 | Alpert et al. | | |
| 9,483,356 B2* | 11/2016 | Lord | ...................... | G06F 12/023 |
| 2005/0188075 A1* | 8/2005 | Dias | .................... | H04L 67/1008 709/224 |

(Continued)

FOREIGN PATENT DOCUMENTS

| | | |
|---|---|---|
| CN | 103164254 A | 6/2013 |
| CN | 103198122 A | 7/2013 |
| CN | 103810036 A | 5/2014 |

OTHER PUBLICATIONS

CN First Office Action and English Translation; Application No. CN 201410301955.0; dated Jan. 19, 2018; 13 pages.

*Primary Examiner* — Bryce P Bonzo
*Assistant Examiner* — Jonathan D Gibson
(74) *Attorney, Agent, or Firm* — Cantor Colburn LLP (57) ABSTRACT

In an embodiment, a method of resource pre-configuration includes obtaining, at a target system, configuration information about a resource that is predicted to be used by a transaction which will be executed on the target system. The resource is configured, at the target system, based on the configuration information. The configuring is before the transaction requests use of the resource.

14 Claims, 2 Drawing Sheets

(56) References Cited

U.S. PATENT DOCUMENTS

| | | | |
|---|---|---|---|
| 2005/0213608 A1* | 9/2005 | Modi | H04L 41/0803 370/468 |
| 2009/0138481 A1* | 5/2009 | Chatley | G06F 3/0613 |
| 2013/0179893 A1* | 7/2013 | Ferdous | G06F 11/3089 718/104 |
| 2014/0089449 A1* | 3/2014 | Bhogal | H04L 67/06 709/213 |
| 2014/0365626 A1* | 12/2014 | Radhakrishnan | H04L 41/5054 709/222 |

\* cited by examiner

RESOURCE PRE-CONFIGURATION

BACKGROUND

Various embodiments of this disclosure relate to computers, and more specifically, to resource pre-configuration.

One or more transactions may be executed on a system such as a database management system (DBMS), a server management system, a transaction management system, a file system, or a storage management system. These transactions usually have to access some resources of the system during running, including files, memory blocks, datasets, and the like. During execution of the transactions, these resources may be configured into a particular state. For example, a file may be kept in an open state while a storage block records relevant storage information of the file and provides services for read/write operations on the file; and frequently accessed data may be relocated from a magnetic disk into a memory or cache, and the like. In another example, when transactions share resources when using data in a file, database table, or memory space, the transactions may add a lock to the shared resources so as to prevent contents of the resources from being altered by other transactions during their access, thereby ensuring data consistency.

After system start-up, when a first batch of transactions are loaded on the system to run, the required resources have not been configured properly yet. Therefore, the first batch of transactions have to configure the resources from the start, e.g., opening a file, reading data on a magnetic disc, setting access rights for a memory, and the like. Therefore, compared with subsequent loaded transactions, execution efficiency of the first batch of transactions is lower. Similarly, when the system shuts down due to maintenance, upgrade, fault or power interruption, the resource state as previously configured by the transactions will be lost or reset. Therefore, when the system restarts, execution efficiency of the first batch of transactions re-loaded on the system to run will also be affected, because they have to perform the resource configuration operation again. In addition, when a new transaction is developed and deployed on the system, it is very likely that the resources that will be used by the transaction have not been configured and used by other transactions. Therefore, the new transaction has to perform initial settings of the resources, thereby degrading its execution efficiency.

Using a mainframe platform as an example, it has been found that for a first batch of transactions loaded after the system is started or re-started, or for a newly deployed transaction, its execution speed can be a couple of or even dozens of times slower than transactions in later batches.

SUMMARY

Embodiments include methods, systems, and computer program products for resource pre-configuration. Configuration information about a resource that is expected to be used by a transaction which is predicted to be executed on a target system is obtained at the target system. The resource is configured, at the target system, based on the configuration information. The configuring is before the transaction requests use of the resource Other features and advantages of the embodiments of the present disclosure will become more comprehensible through the following description.

BRIEF DESCRIPTION OF THE SEVERAL VIEW OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and conveying the scope of the present disclosure to those skilled in the art.

Figure 1:
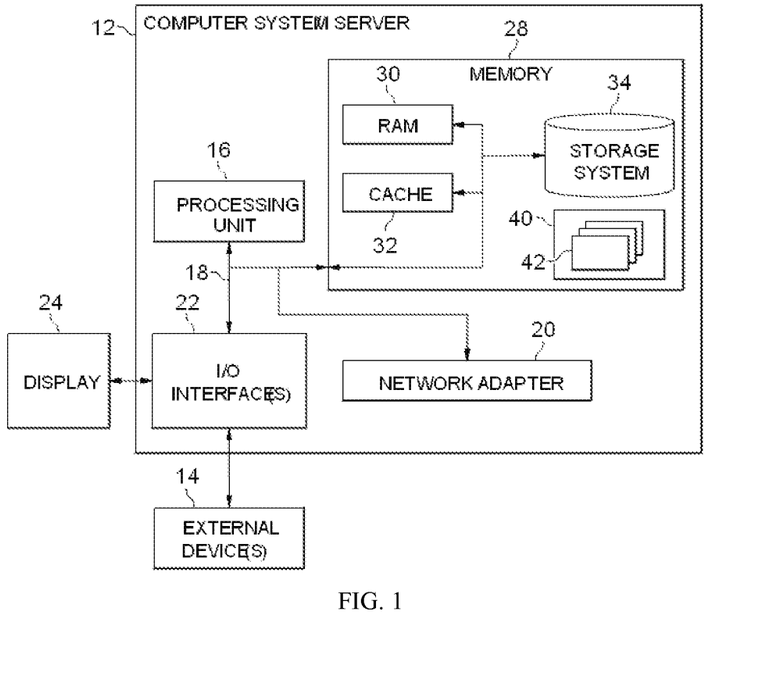
FIG. 1 shows an exemplary computer system/server which is applicable to implement embodiments.

Referring now to FIG. 1, in which an exemplary computer system/server 12 which is applicable to implement embodiments of the disclosure is shown. Computer system/server 12 is only illustrative and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry criterion architecture (ISA) bus, micro channel architecture (MCA) bus, enhanced ISA (EISA) bus, video electronics standards association (VESA) local bus, and peripheral component interconnect (PCI) bus.

Computer system/server 12 typically includes a variety of computer system readable media. Such media may be any available media that is accessible by computer system/server 12, and it can include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, and the like; one or more devices that enable a user to interact with computer system/server 12; and/or any devices (e.g., network card, modem, and the like) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, and the like.

Hereinafter, the mechanism and principles of embodiments will be described in more detail. Unless otherwise indicated, the term "based on" as used hereinafter and in the claims represents "at least partially based on." The term "comprise" or "include" as used herein indicates an open inclusion, i.e., "including, but not limited to." The term "plural" as used herein indicates "two or more." The term "one embodiment" as used herein indicates "at least one embodiment." The term "another embodiment" as used herein indicates "at least one further embodiment." Definitions of other terms will be provided in the following description.

Figure 2:
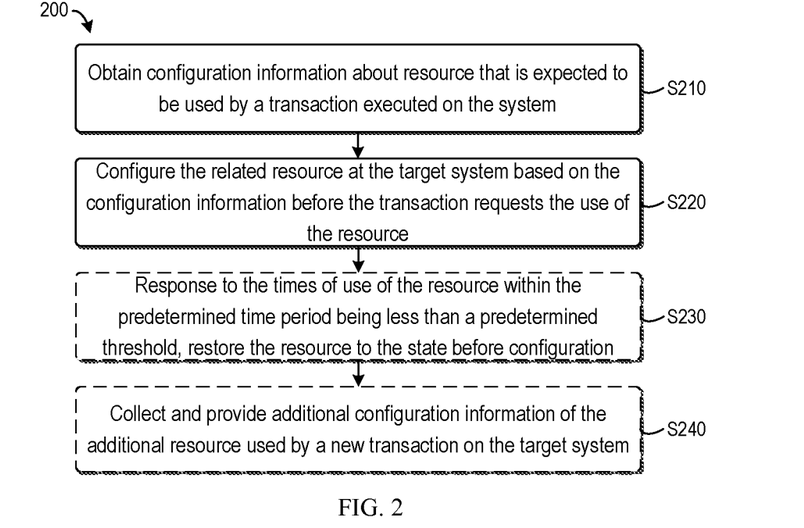
FIG. 2 shows a schematic flow diagram of a method for resource pre-configuration in a system in accordance with embodiments.

FIG. 2 shows a flow chart of a method 200 for resource pre-configuration in a system according to embodiments. The term "system" used herein includes any system running on a physical or virtual machine for executing and managing transactions, including a hardware system, a software system, or a combination thereof. Examples of the system include, but are not limited to, one or more of the following: a DBMS system, a server management system, a file system, a transaction management system, a storage management system, and the like. It will be appreciated that embodiments may be applicable to any currently known or future developed system.

The method 200 begins at block S210, where configuration information about a resource(s) that is expected, or predicted, to be used subsequently by a transaction executed on the system is obtained. For the sake of discussion, the system being considered will be referred to as "a target system."

According to embodiments, obtaining configuration information about resources may be triggered in many cases. For example, in some embodiments, at block S210, configuration information about resources is obtained in response to the start-up of the target system. In the context of the present disclosure, the terms "start" or "start-up" refer to a normal start of the target system, as well as restart or reset of the target system after abnormal shutdown (e.g., due to reasons such as fault and power off).

As mentioned above, traditionally when the target system is just started, it needs to experience a certain period of "preheating." During this period, the resources that are used for the transaction loaded on the target system for execution are not configured yet. For example, a file that needs to be used has not been opened yet, the memory block is not set, and the lock for processing resource contention is not obtained yet, and so on. Accordingly, the first batch of transactions has to complete configuration of these bottom-layer resources, which can affect the execution efficiency.

In order to solve this problem, in some embodiments, at block S210, the target system may voluntarily obtain configuration information about one or more resources during the initiation process. As mentioned above, these resources will be used by the transaction that will be executed on the system after the initiation process of the system. In particular, different from the conventional solutions, according to embodiments, what is obtained at block S210 is configuration information about the resources which are expected to be subsequently used by the transaction and which are independent of the transaction, not only limited to the state of the system or transaction per se.

According to embodiments, the resources that will be used and their configuration information may be obtained in a plurality of different manners. For example, in one embodiment, at block S210, the target system may obtain configuration information about resources from one or more other systems (called "reference systems") other than the target system. For example, in one embodiment, a reference system may be another system located in the same cluster as the target system.

The reference system and the target system may communication in any appropriate manner. For example, in one embodiment, the target system and the reference system may be located on different physical machines. At this point, communication between systems may be implemented through a network communication mechanism such as a local area network and an Internet. Alternatively or additionally, the target system and the reference system may be located on the same physical machine. At this point, communication between systems may also be realized through an internal communication mechanism such as inter-process communication and inter-program communication.

In order to obtain configuration information about resources from the reference server, in one embodiment, after the target system is started, it may transmit a request to one or more reference systems. As a response, each reference system receiving the request may return the resources currently used by the system currently executed on the reference system and configuration information about these resources to the target system. For example, the reference system may determine the currently opened file, content information of the created memory block, shared lock applied by the file and/or other resources, and the like. Such configuration information may be organized using any appropriate format, including, but not limited to, a list, an Extensible Markup Language (XML) file, a configuration file, and the like. Afterwards, the reference system may return the resource configuration information as response information to the target system. Correspondingly, at block S210, the target system may parse resource configuration information in the received response information.

In some embodiments, the reference system is any other system capable of communicating with the target system. Alternatively, in order to further enhance the accuracy of pre-configuration, an appropriate reference system may be selected in advance from a plurality of available candidate systems. For example, in one embodiment, a reference system may be selected based on characteristics of the system, such that the target system and the reference system have the same or similar characteristics.

The term "characteristics" as used herein refers to attributes of traffic features of the system. For example, in one embodiment, the characteristics may include workload of the system. Specifically, in this embodiment, one or more systems performing the same or similar workloads may be selected as a reference system. For example, if the target system is a system mainly responsible for file management, a system likewise responsible for file management may be selected as a reference system, while a system for other workload such as DBMS is excluded. It would be appreciated that when the workload is identical or similar, the probability for the transactions on the target system and reference system to use the same or similar resources will also increase accordingly. In this way, the resource configuration information provided by the reference system will have a larger reference value to the target system.

Alternatively or additionally, when selecting a reference system, a task type of the target server and/or reference server may also be considered. It would be appreciated that even for a plurality of systems processing the same workload, the task type or division might also be different. For example, in one cluster, some systems may be used for completing specific tasks different from other systems. As an example, some systems may be responsible for traffic processing within a particular time period (e.g., work hours), while other systems are responsible for completing data backup in a particular time period (e.g., at night). The resources used by different systems having different task types may have a greater discrepancy. Therefore, in one embodiment, configuration information about resources may be requested to other system having the same or similar task types.

In an embodiment of an implementation, a target system may maintain a list of other systems maintaining the same or similar workload and/or task types. In one embodiment, such a list may be generated and updated by a controller associated with each system. Alternatively or additionally, the list may also be generated and updated in a manual manner. When the target system starts, the list may also be generated and updated by the user in a manual manner. When the target system is started, the list may be accessed, and a reference system may be read from a list so as to transmit a request for the resource configuration information.

It should be noted that the work load and task type are only examples of system characteristics, not intended to limit the scope of embodiments. In an alternative embodiment, any alternative or additional characteristics may be considered to determine a reference system, for example, the computing capability, storing capacity, network condition, and the like of the machine where the system is located.

Additionally, according to embodiments, the target system may receive configuration information about the resources being currently used by these reference systems (referred to as "candidate resources") from more than one reference systems. In one embodiment, the target system may save configuration information about all received candidate resources. Correspondingly, all of these candidate resources will be pre-configured at the target system.

Alternatively, which resources are likely to be used by the transaction performed on a target system may also be determined from among these candidate resources transmitted by the plurality of reference systems. Correspondingly, at block S210, it is allowed to only save configuration information about these resources. According to embodiments, resources to be configured at the target system may be selected from a plurality of candidate resources based on various predetermined criteria.

For example, in one embodiment, resources that might be used may be predicted based on a "voting" mechanism. Specifically, if a candidate resource is used by a reference system exceeding a predetermined number, it may be determined that the resource is also likely used in the target system. Otherwise, if a certain candidate resource is only used by one or a few reference systems, the resource may have a certain specialty. Correspondingly, the target system may discard configuration information about the candidate resources. In this manner, in may effectively avoid increasing the burden of target system or prolong the pre-configuration time due to configuring unnecessary resources.

Only for the sake of illustration, a specific example is discussed with the file as an example. Suppose that the target system receives resource configuration information from N reference systems, and a predetermined vote threshold is M, wherein N and M are natural numbers; and M is less than or equal to N. Each reference system indicates the files being currently opened and used on the reference system. Only when a file is opened and used by M or above reference systems, will the information about the file be saved by the target system.

Besides vote or alternatively, the resources that are likely used at the target system are determined from candidate resources from a plurality of reference servers based on other criteria. For example, different weights may be assigned to different reference servers. The weights may be determined based on various factors, including, but not limited to, workload similarity between the target system and the reference system, similarity between task types, similarity between machine computation capabilities, similarity between network communication conditions, and the like. The weights may also be set and/or amended by the user. Therefore, in one embodiment, one or more candidate resources assigned by the reference server whose weight exceeds the predetermined threshold will be selected. Correspondingly, at block S210, configuration information about these resources may be saved.

By obtaining configuration information about resources from the reference system, it is advantageous to accurately pre-configure resources at the target system. However, in some cases, the target system might not be able to obtain resource configuration information from other systems. For example, a reference system having the same or similar workload or task type might not exist in the cluster. As an example, the task type (e.g., data backup) of the target system might be different from accessible task types (e.g., traffic processing) of all other system, such that it is improper to request the resource configuration information to other systems. For another example, all systems in the cluster likely shut down due to causes such as power supply interruption. At this point, the system re-starting first cannot obtain information from another system.

To this end, according to embodiments, at block S210, configuration information about resources may be locally obtained at the target system. In one embodiment, resource configuration information may be retrieved by accessing a log or checkpoint of a target system. The term "log" as used herein is information for recording system state and/or behavior of the target system within a previous particular time period. The term "checkpoint" as used herein is information for describing system state and/or behavior of a particular time point. Additionally, the term "local" as used herein indicates that the log or checkpoint is logically associated with a target system, rather than limiting the physical storage location of the log or checkpoint.

Specifically, at block S210, the target system may access its own log or checkpoint to determine the resources that were used by a transaction executed on the target system during the previous one or more active running periods. Moreover, it can be determined from the log or checkpoint how these resources are configured in the previous use. In this manner, the target system may also retrieve configuration information of the resources from the log or checkpoint.

It would be appreciated that the local resource configuration information and the resource configuration information from the reference system may be used in combination. In other words, in the case that the resource configuration information has already been received from one or more reference systems, the target system may likewise use information from the log or checkpoint as supplementation. It should be understood that in some embodiments, the target system attempts, in priority, resource configuration information from the external reference system. Such a practice might be advantageous, because the information in the log and/or checkpoint might be saved into a memory system such as magnetic tape. In this case, receiving resource configuration information from a reference system is advantageous for the efficiency of obtaining and integrity of information.

Figure 3:
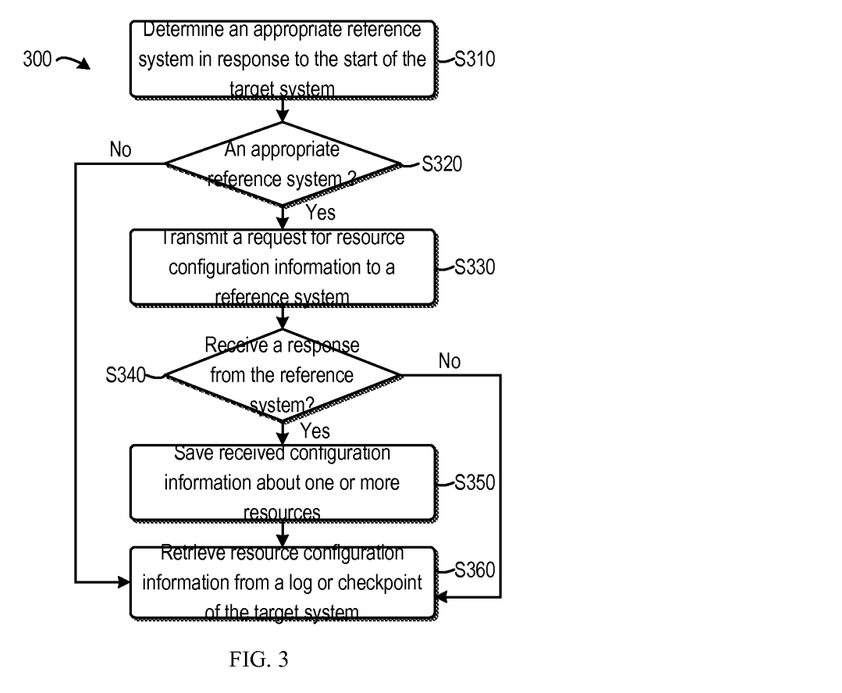
FIG. 3 shows a schematic flow diagram of a method for obtaining resource configuration information at the start of a system according to embodiments.

FIG. 3 shows a flow chart of a method 300 for obtaining configuration information about resources at the start of a system. It will be appreciated that the method 300 in FIG. 3 is an exemplary implementation of block S210 in the method 200 shown in FIG. 2 for obtaining configuration information about the resources at the start of the system.

As shown in the figure, the method 300 starts from block S310, where it is determined whether an appropriate reference system is present in response to the start of the target system. As mentioned above, a reference system may also be determined based on various factors such as workload, task type, and the like.

At block S320, if it is determined that there is no reference system applicable to the current target system, the method 300 proceeds to block S360, where the required resource configuration information is retrieved from the log or checkpoint of the target system. It would be appreciated that at this point, the log or checkpoint acts as an option for the reference system.

Otherwise, if it is determined, at block S320, that there is an appropriate reference system (branch "yes"), the method 300 proceeds to block S330, where a request for resource configuration information is transmitted to the reference system. Next, the method 300 determines, at block S340, whether a response to the reference system is received.

Due to causes such as shutdown and communication fault of the reference system, the target system might not receive a response from the reference system (branch "No" of the block S340) within a predetermined wait time. At this point, the method 300 proceeds to block S360, so as to retrieve resource configuration information from the log or checkpoint.

If a response from a reference system is received at block S340 (branch "yes"), the method 300 proceeds to block S350, where the receiving configuration information about one or more resources may be saved. Alternatively, as mentioned above, resources that will be configured at the target system may also be selected from the received candidate resources based on various mechanisms such as vote (i.e., resources expected to be used at the target system). In this embodiment, only the configuration information about the selected resources is saved.

After block S350, the method 300 proceeds to block S360, where configuration information about the resources is retrieved from log or checkpoint. At this point, the log or checkpoint acts as supplementation of the reference server. Of course, it would be appreciated that block S360 may not be performed after performing block S350. In other words, it is feasible to only use the resource configuration information from the reference system.

Return to FIG. 2 to continue discussion of block S210. According to embodiments, in addition to or instead of obtaining resource configuration information in response to the start of system, the configuration information of resources may be obtained in the running state of the system. The term "running state" as used herein refers to a normal running state of the target system after completion of the start process.

For example, in one embodiment, one or more systems in the cluster may monitor in real-time a transaction newly deployed on the system. For any given system, the new transaction refers to a transaction previously not executed on the system. When a system monitors execution of a new transaction, the system may collect additional configuration information of additional resource used by the new transaction, and provide the additional configuration information. In one embodiment, the additional configuration information may be provided to a controller in the cluster. Alternatively, additional configuration information about the additional resource may also be directly transmitted between the systems through a point-to-point manner.

In such an embodiment, at block S210, the target system may receive additional configuration information of additional resource from the one or more reference systems at the running state. In this way, the target system subsequently may configure the additional resources. Therefore, when the corresponding new transaction is subsequently loaded on the target system for execution, the new transaction needs not configure additional resources by itself, because these resources have been pre-configured before request of the new transaction or attempting to use them. In this way, the execution efficiency of the new transaction may be significantly improved.

It should be understood that the feature of obtaining configuration information about resources as described in conjunction with the start of the system is likewise applicable for the target system receiving the configuration information about resources at the running state. For example, in one embodiment, only when a certain additional resource is used by reference systems with a number greater than a predetermined number in a cluster, can the target system reserve the configuration information of the additional resource for subsequent configuration.

Continue reference to FIG. 2, the method 200 continues proceeding to block S220. At block S220, corresponding one or more resources are configured at the target system based on the configuration information obtained at block S210. It would be appreciated that when these resources are configured, the transaction on the target system does not attempt use of these resources. Actually, at this time, a transaction using these resources might not be started for execution on the target system yet.

In particular, in the context of present disclosure, the pre-configuration of the resources not only comprises a full configuration, it comprises a partial configuration. Specifically, in some embodiments, before the transaction requests for use of particular resources, all configuration work of the resources has been completed at block S220. Alternatively, in some other embodiments, when an application requests for use of the resource, the resource has been partially configured at the block S220. At this point, when the transaction starts use of the resources, the remaining configuration work may be continued to be completed by the transaction and/or the target system. Therefore, any solution of starting the configuration operations on the resources before the transaction requests for use of the resources falls within the scope of embodiments.

As an example, in one embodiment, resource configuration at block S220 may include configuring an access state of resources, e.g., opening a file. Alternatively or additionally, resource configuration at block S220 may include configuring a storage state of resources, e.g., invoking data from the magnetic diskette into a designated memory segment in the memory, or placing data into cache. Alternatively or additionally, resource configuration at block S220 may include configuring data consistency of resources, e.g., obtaining a lock regarding resources, and the like.

As mentioned above, according to embodiments, configuration of these blocks at block S220 is a kind of "pre-configuration" for the transaction, i.e., configuration before the transaction requests for use of resources. With system start as an example, resource pre-configuration may be completed during the start process. In other words, with the completion of the system start process, with the completion of the system start process, it is likely that the configuration of the resources subsequently used by the transaction has been completed. In this way, when a first batch of transactions have been loaded on the system, it would be unnecessary to further configure these resources; instead, they may directly use these resources to execute their normal operations. For example, in one embodiment, during the pre-configuration process, a file that needs to be used by the transaction may be opened, the data to be accessed by the transaction may be scheduled, and data consistency settings may be completed, and the like. In this way, the first batch of transactions may directly use the file and data without data conflict, thereby significantly improving execution efficiency, which avoids efficiency issue caused by "preheating." Similarly, according to embodiments, the execution efficiency on the new transaction on the system may also be improved.

In some embodiments, the method 200 may proceed to block S230, where one or more resources configured at block S220 are monitored, and resource configuration may be revoked where necessary.

It would be understood that pre-configuration of a given resource is made based on the following predictions at block S220. That is, the resource is likely used by a transaction on the target system. If it is found that the configured resource is not used by the transaction or rarely used thereby, the initial state of the resource may be restored at block S230, thereby avoiding unnecessary inter-system contention about this resource. In this manner, potential adverse impact due to error prediction may be effectively avoided.

Specifically, at block S230, the times of use of the resources may be monitored within a predetermined time period after configuration of the resource is completed. If it is found that the use times of the resource within the predetermined time period is less than a threshold or even not used at all, the resource may be restored to the state before the configuration is performed at block S220. For example, if a file is opened at block S220 but is not accessed by the transaction within the subsequent predetermined time period, then the file may be closed at block S230.

It would be appreciated that block S230 is optional (shown in dotted-line in the figure). For example, in some embodiments, after pre-configuration of the resource is completed, it is allowed not to perform real-time monitoring of the resource use condition and the corresponding configuration revoking action. Instead, upon detection of the resource conflict, the system or user handles according to a corresponding conflict resolution policy.

In some embodiments, the method 200 may proceed to block S240, where the target system may provide additional configuration information about additional resource used by the new transaction performed on the target system to one or more other systems. In other words, besides receiving configuration information of additional resources from other reference system at block S210, the target system may act as a reference system for other systems. This end-to-end architecture can propagate resource configuration condition about the new transaction in a system cluster in a very effective manner.

Specifically, in such embodiment, at block S240, the target system may monitor in real-time execution of the new transaction in running state. Once this new transaction is monitored, additional configuration information of the additional resource used by the new transaction will be collected. Next, the target system may provide the generated additional configuration information. As mentioned above, the target system may directly provide the additional configuration information about the additional resource to other systems in the cluster, and/or to a controller in the cluster for forwarding.

By way of example, suppose that the target system executes a new transaction when other systems are idle (e.g., at night). At this point, at block S240, the additional configuration information of the additional resource used by the new transaction may be collected by the target system and provided to other system in the cluster, e.g., a system having similar characteristics. In this way, when other systems return to a work state and are loaded with the new transaction, the new transaction may be efficiently executed.

Similar to block S230, block S240 is optional (shown in dotted-line in the figure). In other words, the target system may only collect resource configuration information regarding the new transaction from other reference systems, without providing such information to the other systems.

Figure 4:
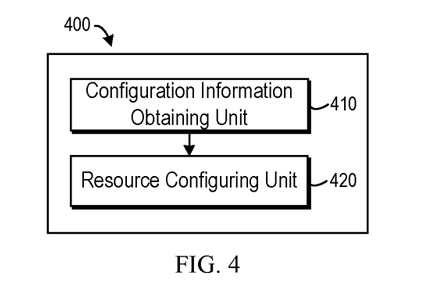
FIG. 4 shows a schematic block diagram of an apparatus for resource pre-configuration in a system according to embodiments.

FIG. 4 shows a schematic block diagram of an apparatus 400 for resource pre-configuration according to embodiments. As shown, the apparatus 400 comprises: a configuration information obtaining unit 410 configured to obtain, at a target system, configuration information about a resource, the resource being expected to be used by a transaction which will be executed on the target system; and a resource configuring unit 420 configured to configure, at the target system, the resources based on the configuration information before the transaction requests for use of the resources.

In one embodiment, the configuration information obtaining unit 410 may comprise a start state obtaining unit configured to obtain the configuration information about the resource in response to start of the target system. Correspondingly, the resource configuring unit 420 comprises: a start state configuring unit configured to configure the resource based on the configuration information during the start process of the target system.

In one embodiment, the configuration information obtaining unit 410 may comprise a configuration information receiving unit configured to receive the configuration information about the resource from a reference system other than the target system.

In such an embodiment, the apparatus 400 may also comprise a reference system selecting unit configured to select a system having the same or similar characteristics as the reference system, which characteristics including at least one of workload and task type.

In one embodiment, the configuration information receiving unit is configured to receive configuration information about the candidate resource from the reference system. In this embodiment, the apparatus 400 may also comprise a resource determining unit configured to determine the resource, from among the candidate resources, which is expected to be used by the transaction executed on the target system.

In one embodiment, the configuration information receiving unit may comprise a running state receiving unit configured to receive the configuration information about the resource from the reference system in the running state of the target system.

In one embodiment, the apparatus 400 may also comprise an additional resource tracking unit configured to collect additional configuration information about an additional resource used by the transaction in response to a new transaction being executed on the target system; and additional resource reporting unit configured to provide the additional configuration information about the additional resource.

In one embodiment, the configuration information obtaining unit 410 may comprise a log access unit configured to access a log or checkpoint of the target system; and a configuration information retrieval unit configured to retrieve the configuration information of the resource from the log or the checkpoint.

In one embodiment, the apparatus 400 may further comprise a configuration restoration unit configured to restore the resource into the state before configuration in response to times of use of the resource within the predetermined time period being less than a predetermined threshold.

In one embodiment, the resource configuring unit 420 may comprise at least one of the following: an access state configuring unit configured to configure an access state of the resource; a storing state configuring unit configured to configure a storing state of the resource; and a consistency state configuring unit configured to configure a data consistency state of the resource.

It should be noted that for the sake of clarity, FIG. 4 does not show optional units or sub-units included in the apparatus 400. All features and operations as described above are suitable for apparatus 400, respectively, which are therefore not detailed here. Moreover, partitioning of units or subunits in apparatus 400 is exemplary, rather than limitative, intended to describe its main functions or operations logically. A function of one unit may be implemented by a plurality of other units; on the contrary, a plurality of units may be implemented by one unit. The scope of the embodiments is not limited in this aspect.

Moreover, the units included in the apparatus 400 may be implemented by various manners, including software, hardware, firmware or a random combination thereof. For example, in some embodiments, the apparatus may be implemented by software and/or firmware. Alternatively or additionally, the apparatus 400 may be implemented partially or completely based on hardware. for example, one or more units in the apparatus 400 may be implemented as an integrated circuit (IC) chip, an application-specific integrated circuit (ASIC), a system on chip (SOC), a field programmable gate array (FPGA), and the like. The scope of embodiments are not limited to this aspect.

Generally, embodiments provide a technical solution for pre-configuring resources in a system.

In one aspect, embodiments provide a method of resource pre-configuration. The method comprises: obtaining, at a target system, configuration information about a resource, the resource being expected to be used by a transaction which will be executed on the target system; and configuring, at the target system, the resource based on the configuration information before the transaction requests for use of the resources.

In another aspect, embodiments provide an apparatus for resource pre-configuration. The apparatus comprises: a configuration information obtaining unit configured to obtain, at a target system, configuration information about a resource, the resource being expected to be used by a transaction which will be executed on the target system; and a resource configuring unit configured to configure, at the target system, the resource based on the configuration information before the transaction requests for use of the resources.

According to embodiments, resources that are likely to be used by a transaction on a system in the future can be configured in advance, i.e., pre-configuration. Through such pre-configuration, when the transaction is loaded and executed, it would be unnecessary to make an initial configuration to the resources to thereby dampen the execution efficiency. On the contrary, the transaction may directly use the resources that the system has configured well in advance, which will significantly improve the execution speed of the transaction. In some embodiments, the resource pre-configuration may be completed at an initiation process of the system. Alternatively or additionally, the resources may be pre-configured for the new transaction to be deployed. In particular, by sharing resource configuration information between multiple systems in communication with one another, resource pre-configuration can be implemented more effectively.

Embodiments include a system, a method, and/or a computer program product. The computer program product may include a computer readable storage medium (or media) having computer readable program instructions thereon for causing a processor to carry out aspects of embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of the disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of resource pre-configuration, the method comprising:
predicting, at a target system, a file that is to be used by a transaction when the transaction is executed on the target system, the predicting comprising:
selecting, by the target system, a reference system from a plurality of reference systems, wherein the selection of the reference system from the plurality of reference systems is based at least in part on a similarity between a workload of the target system and workloads of the plurality of reference systems and on a similarity between a task type of the target system and task types of the plurality of reference systems, wherein the selected reference system is currently using a plurality of candidate files; and selecting, by the target system, the file from the plurality of candidate files based on predetermined criteria;

obtaining, at the target system, configuration information about the file in response to a start of the target system;

configuring, at the target system, the file based on the configuration information, the configuring being performed during the start of the target system and before the transaction requests use of the file; and after the configuring of the file at the target system, monitoring, at the target system, times of use of the file within a predetermined time period, and upon the times of use being less than a predetermined threshold, restoring the file to a state before the configuring was performed.

2. The method according to claim 1, wherein the obtaining, at the target system, configuration information about the file further includes:
receiving the configuration information about the file from the selected reference system.

3. The method according to claim 2, wherein the selecting of the reference system from the plurality of reference systems includes:
selecting as the reference system a system having same or similar workload and a task type with the target system.

4. The method according to claim 2, wherein the receiving the configuration information about the file from a reference system comprises:
receiving configuration information about candidate files from the reference system; and
determining, based on a predetermined criterion and from the candidate files, the file expected to be used by the transaction executed on the target system.

5. The method according to claim 2, wherein the receiving the configuration information about the file from the reference system comprises:
receiving the configuration information about the file from the reference system at a running state of the target system.

6. The method according to claim 1, further comprising:
collecting, at the target system, additional configuration information about an additional file used by a new transaction in response to the new transaction being executed on the target system; and
acting as a reference system by the target system by providing, by the target system, the additional configuration information about the additional file to another system of the plurality of reference systems, wherein the additional configuration information is provided by the target system to the other system in response to receiving a request from the other system for the additional configuration information.

7. The method according to claim 1, wherein the configuring, at the target system, the file based on the configuration information comprises at least one of:
configuring an access state of the file;
configuring a storing state of the file; and
configuring a data consistency state of the file.

8. A system for resource pre-configuration, the system comprising:
a memory having computer readable instructions; and
one or more processors for executing the computer readable instructions, the computer readable instructions comprising:
predicting, at a target system, a file that is to be used by a transaction when the transaction is executed on the target system, the predicting comprising:
selecting, by the target system, a reference system from a plurality of reference systems, wherein the selection of the reference system from the plurality of reference systems is based at least in part on a similarity between a workload of the target system and workloads of the plurality of reference systems and on a similarity between a task type of the target system and task types of the plurality of reference systems, wherein the selected reference system is currently using a plurality of candidate files; and
selecting, by the target system, the file from the plurality of candidate files based on predetermined criteria;
obtaining, at the target system, configuration information about the file in response to a start of the target system;
configuring, at the target system, the file based on the configuration information, the configuring being performed during the start of the target system and before the transaction requests use of the file; and
after the configuring of the file at the target system, monitoring, at the target system, times of use of the file within a predetermined time period, and upon the times of use being less than a predetermined threshold, restoring the file to a state before the configuring was performed.

9. The system according to claim 8, wherein the obtaining, at the target system, configuration information about the file further includes:
receiving the configuration information about the file from the selected reference system.

10. The system according to claim 9, wherein the selecting of the reference system from the plurality of reference systems includes
selecting as the reference system a system having same or similar workload and a task type with the target system.

11. The system according to claim 9, wherein the receiving the configuration information about the file from a reference system comprises:
receiving configuration information about candidate files from the reference system; and
determining, based on a predetermined criterion and from the candidate files, the file expected to be used by the transaction executed on the target system.

12. The system according to claim 9, wherein the receiving the configuration information about the file from the reference system comprises:
receiving the configuration information about the file from the reference system at a running state of the target system.

13. The system according to claim 8, wherein the computer readable instructions further comprise:
collecting, at the target system, additional configuration information about an additional file used by a new transaction in response to the new transaction being executed on the target system; and
acting as a reference system by the target system by providing, by the target system, the additional configuration information about the additional file to another system of the plurality of reference systems, wherein the additional configuration information is provided by the target system to the other system in response to receiving a request from the other system for the additional configuration information.

14. A computer program product for resource pre-configuration, the computer program product comprising a computer readable storage medium having program instructions embodied therewith, the program instructions executable by a processor to cause the processor to perform a method comprising:

predicting, at a target system, a file that is to be used by a transaction when the transaction is executed on the target system, the predicting comprising:

selecting, by the target system, a reference system from a plurality of reference systems, wherein the selection of the reference system from the plurality of reference systems is based at least in part on a similarity between a workload of the target system and workloads of the plurality of reference systems and on a similarity between a task type of the target system and task types of the plurality of reference systems, wherein the selected reference system is currently using a plurality of candidate files; and selecting, by the target system, the file from the plurality of candidate files based on predetermined criteria;

obtaining, at the target system, configuration information about the file in response to a start of the target system;

configuring, at the target system, the file based on the configuration information, the configuring being performed during the start of the target system and before the transaction requests use of the file; and after the configuring of the file at the target system, monitoring, at the target system, times of use of the file within a predetermined time period, and upon the times of use being less than a predetermined threshold, restoring the file to a state before the configuring was performed.

* * * * *